(12) United States Patent
Takasaki

(10) Patent No.: US 6,739,815 B2
(45) Date of Patent: May 25, 2004

(54) WOOD SCREW

(75) Inventor: Seiichiro Takasaki, Osaka (JP)

(73) Assignee: Yao Seibyo Co., Ltd., Osaka (JP)

( * ) Notice: Subject to any disclaimer, the term of this patent is extended or adjusted under 35 U.S.C. 154(b) by 0 days.

(21) Appl. No.: 10/197,753

(22) Filed: Jul. 19, 2002

(65) Prior Publication Data
US 2003/0021653 A1 Jan. 30, 2003

(30) Foreign Application Priority Data
Jul. 27, 2001 (JP) ........................................ 2001-227767

(51) Int. Cl.$^7$ .............................. F16B 25/10; F16B 35/04
(52) U.S. Cl. ................ 411/387.1; 411/412; 411/387.2; 411/387.3
(58) Field of Search ................................ 411/412, 413, 411/387.1, 387.2, 387.3, 386

(56) References Cited

U.S. PATENT DOCUMENTS

| 2,183,243 | A | * | 12/1939 | Meersteiner | ................ | 411/453 |
|---|---|---|---|---|---|---|
| 3,426,642 | A | * | 2/1969 | Phipard, Jr. | ................. | 411/417 |
| 3,699,841 | A | * | 10/1972 | Lanius, Jr. | ................ | 411/387.2 |
| 4,259,889 | A | * | 4/1981 | Capuano | ..................... | 411/417 |
| 5,015,134 | A | * | 5/1991 | Gotoh | ........................ | 411/386 |

FOREIGN PATENT DOCUMENTS

JP          5-14005          4/1993

* cited by examiner

Primary Examiner—Heather Shackelford
Assistant Examiner—Lisa Saldano
(74) Attorney, Agent, or Firm—Wenderoth, Lind & Ponack, L.L.P.

(57) ABSTRACT

A wood screw is provided which can be smoothly driven in with a small driving force. Helical ribs that are the highest at the center and gradually lower toward both ends are formed on the outer periphery of the tip of a shank having threads on the outer periphery at intervals of 180° in the circumferential direction. Each helical rib is a discontinuous body formed by a plurality of protrusions having different heights. This reduces the turning resistance imparted to the helical ribs, thereby reducing the driving force required.

2 Claims, 4 Drawing Sheets

WOOD SCREW

BACKGROUND OF THE INVENTION

This invention relates to a wood screw.

As a wood screw driven into wood such as a wood board, one is known in which threads are formed on the outer periphery of a shank having a tapered portion at its tip, and the threads on the leading side, which are formed on the tapered portion at the tip of the shank, have a larger lead angle than the threads on the trailing side.

With such a conventional wood screw, since the leading threads have the function as drill edges, initial driving is smooth. But in the case of a wood screw having a long driving length, as the contact length of the threads increases, heat buildup increases, so that the threads tend to seize. In particular, if the wood into which the wood screw is driven is hard, much heat is produced in the threads, so that due to seizure, the wood screw tends to be broken.

In order to avoid such a problem, the present applicant has already proposed in JP utility model publication 5-14005 a wood screw in which two helical ribs of which the height gradually lowers from the longitudinal center toward both ends and which have an isosceles triangular sectional shape are formed on the outer periphery of the tip of a shank having threads on the outer periphery at intervals of 180° in the circumferential direction such that the angle (lead angle) formed by the ridgeline of each helical rib and a plane perpendicular to the shank is greater than the lead angle of the threads.

In the wood screw described in this publication, when the wood screw is driven in, the ridgelines of the helical ribs penetrate into the wood while cutting off a threaded hole tapped by the threads on the tapered portion at the tip of the shank to form helical grooves, and the trailing threads in the rear of the helical grooves are driven into the inner periphery of the helical grooves. Thus the wood screw can be relatively smoothly driven into even hard wood. Heat buildup is small. Thus, it can be driven in without causing seizure.

In the wood screw proposed in the above publication, since the two helical ribs each have an isosceles triangular section and extend continuously in the longitudinal direction and the lead angle is greater than the lead angle of the threads, turning resistance imparted to the helical ribs is relatively large, so that a large force is needed to drive it in. Thus, improvement in lowering the driving force has been expected.

In order to reduce the turning resistance, it is effective to reduce the lead angle of the helical ribs or lower their maximum height. But by doing so, the groove width of the helical grooves formed by the helical ribs is decreased or their depth is reduced. This increases the resistance when the trailing threads are driven, so that heat buildup tends to occur.

An object of this invention is to provide a wood screw which can be smoothly driven into even hard wood with a small driving force.

SUMMARY OF THE INVENTION

According to this invention, there is provided a wood screw comprising a shank having a tapered portion at a tip thereof, threads formed on the outer periphery of the shank, two helical ribs formed on the outer periphery of the tip of the shank spaced 180° from each other in the circumferential direction, the helical ribs being the highest at the longitudinal center and gradually lowering toward both ends, the maximum height of each helical rib being less than the height of the threads, the angle formed by the helical ribs and a plane perpendicular to the shank being greater than the lead angle of the threads, each of the helical ribs comprising a discontinuous body formed by a plurality of conical protrusions having different heights.

The discontinuous bodies as used herein refer to ones in which the apexes of the plurality of protrusions are completely separate from each other. But the bottoms of the protrusions may be separate or connected together.

By forming each helical rib from the discontinuous bodies of the plurality of conical protrusions having different heights, when the wood screw is driven in, it is possible to lower the turning resistance imparted to the helical ribs, so that the screw can be smoothly driven into even hard wood with a small driving force.

According to this invention, there is also provided a wood screw comprising a shank having a tapered portion at a tip thereof, threads formed on the outer periphery of the shank, two helical ribs formed on the outer periphery of the tip of the shank spaced 180° from each other in the circumferential direction, the helical ribs being the highest at the longitudinal center and gradually lowering toward both ends, the maximum height of each helical rib being less than the height of the threads, the angle formed by the helical ribs and a plane perpendicular to the shank being greater than the lead angle of the threads, each of the helical ribs comprising a conical protrusion disposed at the center of its length, the height of the conical protrusion being smaller than the height of the threads.

By providing a conical protrusion at the longitudinal center of each helical rib as described above, it is possible to suppress the maximum height of the helical ribs. Thus it is possible to reduce the turning resistance imparted to the helical ribs. Thus, the screw can be smoothly driven into even hard wood with a small driving force.

In either of the first and second inventions, the protrusions may be conical or pyramidal.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
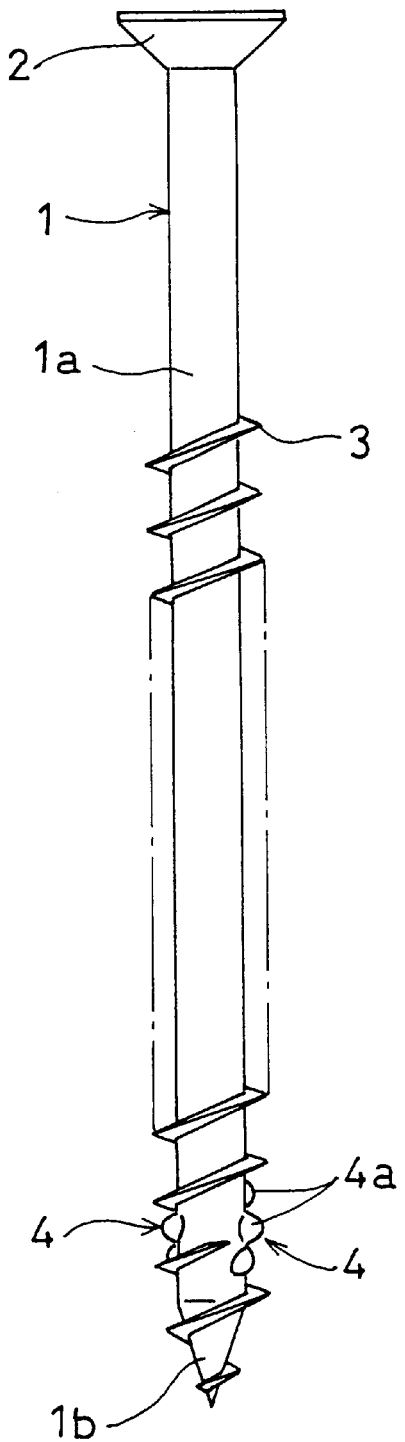
FIG. 1 is a front view of a first embodiment of the wood screw according to this invention.

Hereinbelow, embodiments of this invention will be described with reference to the drawings. FIGS. 1–4 show the first embodiment of the wood screw according to this invention. As shown, a shank 1 has a tapered portion 1b formed at the tip of a straight portion 1a. A head 2 is provided at the rear end of the shank 1.

The head 2 is formed with an engaging portion for tools such as a driver, though not shown in the figures.

On the shank 1, threads 3 are formed from the tapered portion 1b to the straight portion 1a. The shank 1 also has two helical ribs 4 on the outer periphery of the tip of the straight portion 1a spaced 180 degrees from each other in the circumferential direction.

Figure 3:
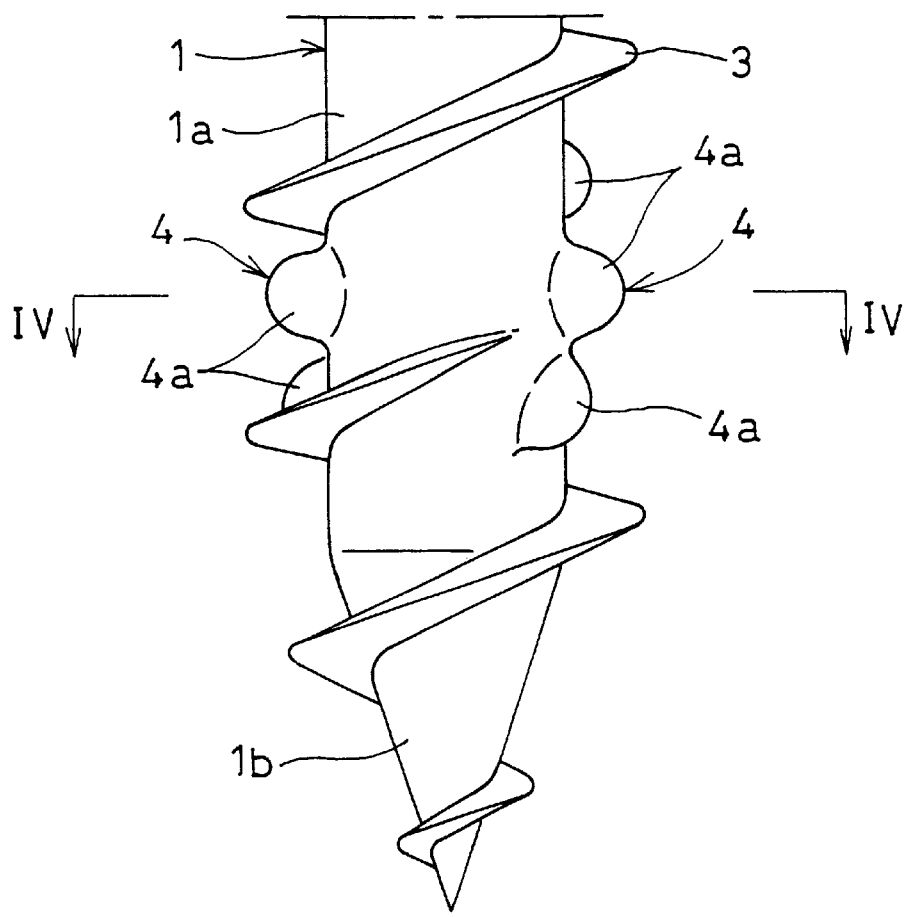
FIG. 3 is an enlarged front view showing the tip of the shank of the same.
Figure 4:
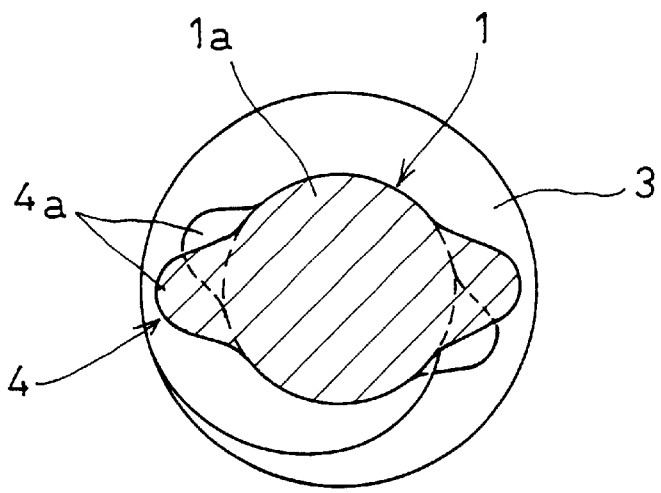
FIG. 4 is a sectional view taken along line IV—IV of FIG. 3.

As shown in FIGS. 1 and 3, the helical ribs 4 each comprise discontinuous conical protrusions 4a having different heights, with the protrusion 4a located at the center the highest and their heights gradually decreasing toward both ends. The height of the highest protrusion 4a is lower than the height of the threads 3.

Figure 2:
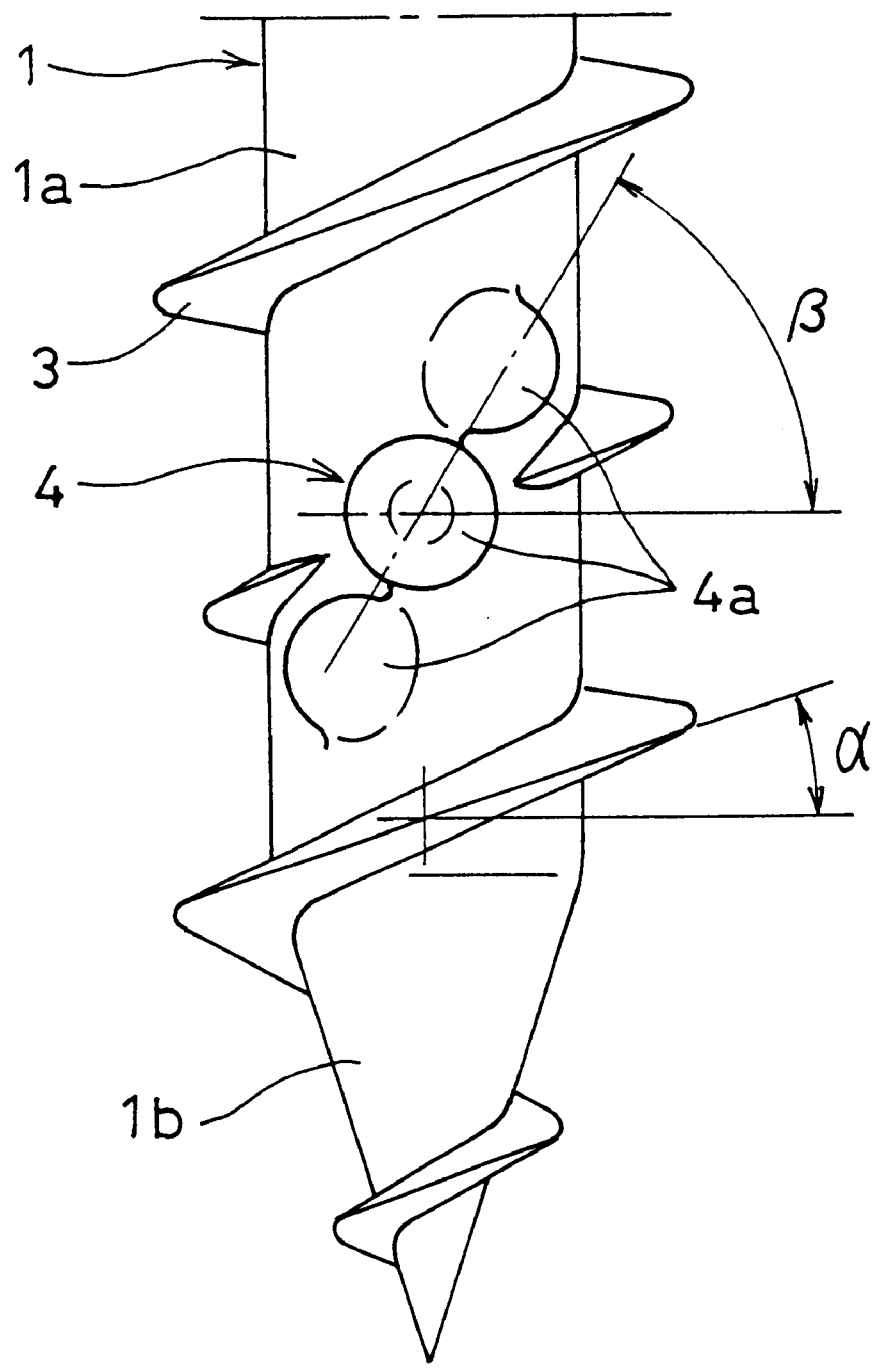
FIG. 2 is an enlarged side view showing the tip of the shank of the same.

As shown in FIG. 2, the angle $\beta$ formed by the line connecting the apexes of the plurality of protrusions 4a of each helical rib 4 and a plane perpendicular to the axis of the shank 1 is about 60 degrees, and greater than the lead angle $\alpha$ of the threads 3.

The wood screw shown in the first embodiment has such a structure. When the wood screw is driven into wood, the threads 3 on the tapered portion 1b tap a hole and the tapped hole is helically cut by the helical ribs 4 comprising discontinuous protrusions 4a to form helical grooves. With the hole formed with the helical grooves as a starting hole, the trailing threads 3 are driven into wood.

Since the helical ribs 4, which form the helical grooves, are formed by the discontinuous protrusions 4a having different heights, turning resistance imparted to the helical ribs 4 is extremely small, compared with helical ribs comprising a continuous protrusion having a sectional shape of an isosceles triangle. Thus the helical ribs 4 penetrate smoothly into wood to form the helical grooves. Since with the hole formed with the helical grooves as a starting hole, the trailing threads 3 are driven in, it is possible to extremely smoothly drive the screw into even hard wood with a small driving force. Also, since the amount tapped by the trailing threads 3 is small and heat buildup due to contact with wood is small, seizure will hardly occur.

Figure 5A:
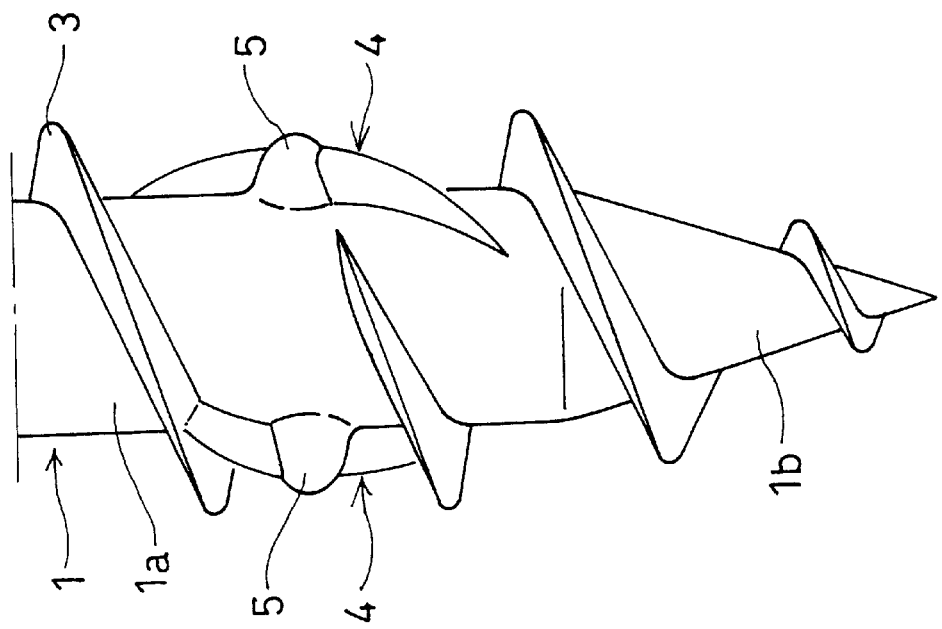
FIG. 5A is a front view showing a second embodiment of the wood screw according to this invention.
Figure 5B:
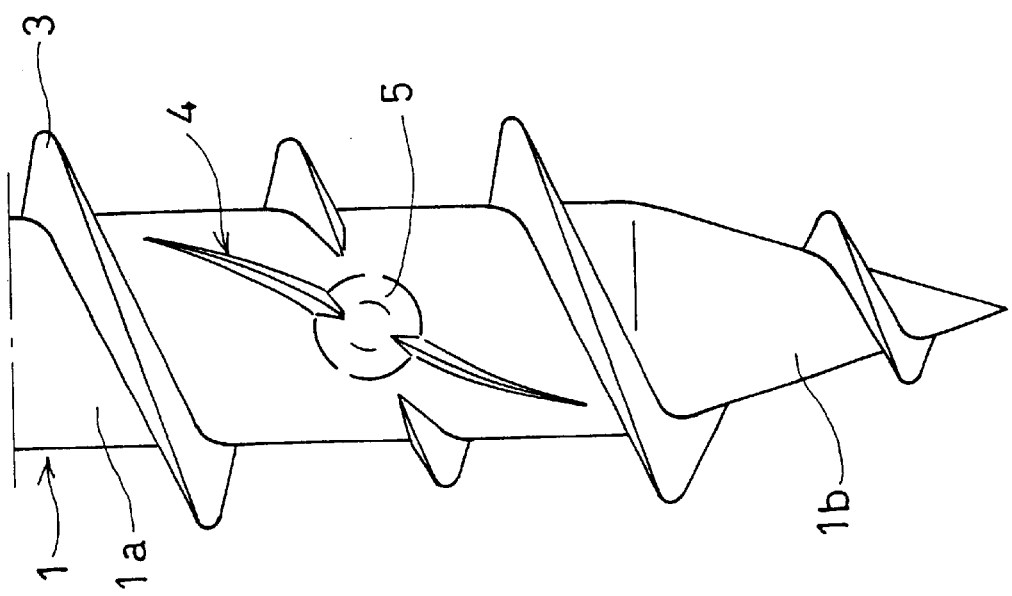
FIG. 5B is a side view of the same.

FIGS. 5A and 5B show the second embodiment of the wood screw according to this invention. This embodiment differs from the first embodiment in that each of the two helical ribs 4 formed on the outer periphery of the tip of the shank 1 is a continuous body of an isosceles triangular sectional shape, but has a conical protrusion 5 at the center between both ends thereof.

Thus, the same portions as in the wood screw shown in the first embodiment are indicated by the same reference numbers and their description is omitted.

Like the helical ribs 4 shown in FIG. 2, the lead angle of the helical ribs 4 in this embodiment is greater than the lead angle of the threads 3 and is about 60°±15°. The height of the protrusions 5 from the surface of the shank 1 is less than the height of the threads 3.

As described above, by forming the conical protrusion 5 at the longitudinal center of each helical rib 4, when the wood screw is driven in, the protrusions 5 cut the helical grooves formed by the helical ribs 4, thereby enlarging the groove width and depth. Thus, compared with helical ribs 4 each comprising a continuous rib having an isosceles triangular sectional shape, in forming helical grooves of the same width and depth, it is possible to suppress the maximum height of the helical ribs 4 to a low value. Thus it is possible to reduce the turning resistance imparted to the helical ribs 4.

Thus, the driving force required for driving decreases, so that the screw can be smoothly driven into even hard wood.

By forming the helical ribs from a plurality of discontinuous protrusions having different heights, it is possible to reduce turning resistance imparted to the helical ribs, so that the wood screw can be smoothly driven into hard wood with a small driving force.

By forming a conical protrusion at the longitudinal center of each helical rib, it is possible to lower the maximum height of the helical ribs, so that it is possible to reduce turning resistance imparted to the helical ribs. Thus, the wood screw can be smoothly driven into hard wood with a small driving force.

What is claimed is:

1. A wood screw comprising a shank having a tapered portion at a tip thereof, threads formed on the outer periphery of said shank, two helical ribs formed on the outer periphery of the tip of said shank spaced 180° from each other in the circumferential direction, said helical ribs being the highest at the longitudinal center and gradually lowering toward both ends, the maximum height of each of said helical ribs being less than the height of said threads, the angle formed by said helical ribs and a plane perpendicular to said shank being greater than the lead angle of said threads, each of said helical ribs comprising a discontinuous body formed by a plurality of conical protrusions having different heights.

2. A wood screw comprising a shank having a tapered portion at a tip thereof, threads formed on the outer periphery of said shank, two helical ribs formed on the outer periphery of the tip of said shank spaced 180° from each other in the circumferential direction, said helical ribs being the highest at the longitudinal center and gradually lowering toward both ends, the maximum height of each of said helical ribs being less than the height of said threads, the angle formed by said helical ribs and a plane perpendicular to said shank being greater than the lead angle of said threads, each of said helical ribs comprising a conical protrusion disposed at the center of its length, the height of said conical protrusion being smaller than the height of said threads.

* * * * *